United States Patent
Takasugi et al.

[11] Patent Number: 6,148,886
[45] Date of Patent: Nov. 21, 2000

[54] PNEUMATIC TIRE AND PNEUMATIC TIRE SET

[75] Inventors: Motohide Takasugi; Hikomitsu Noji; Masaki Noro; Naoyuki Katsura, all of Hiratsuka, Japan

[73] Assignee: The Yokohama Rubber Co., Ltd., Tokyo, Japan

[21] Appl. No.: 09/101,782

[22] PCT Filed: Dec. 10, 1997

[86] PCT No.: PCT/JP97/04531

§ 371 Date: Jul. 22, 1998

§ 102(e) Date: Jul. 22, 1998

[87] PCT Pub. No.: WO98/25776

PCT Pub. Date: Jun. 18, 1998

[30] Foreign Application Priority Data

Dec. 10, 1996 [JP] Japan ............................ 8-329664
Dec. 13, 1996 [JP] Japan ............................ 8-333939
Jan. 14, 1997 [JP] Japan ............................ 9-95764

[51] Int. Cl.$^7$ .......................... B60C 11/03; B60C 11/12; B60C 115/00; B60C 119/00
[52] U.S. Cl. ......................... 152/209.2; 152/209.28; 152/904
[58] Field of Search ................... 152/209.1, 209.2, 152/209.11, 209.13, 209.18, 904, DIG. 3; D12/151

[56] References Cited

U.S. PATENT DOCUMENTS

| | | | |
|---|---|---|---|
| D. 346,777 | 5/1994 | Haas et al. ............... | D12/151 |
| D. 411,153 | 6/1999 | Cesarini et al. ........... | D12/151 |
| 1,127,517 | 2/1915 | Richardson ............... | 152/209.28 |
| 1,996,418 | 4/1935 | Hargraves ................ | 152/209.1 |
| 1,999,988 | 4/1935 | Anderson ................. | 152/209.1 |
| 2,000,785 | 5/1935 | Nellen et al. ............ | 152/209.1 |
| 2,415,290 | 2/1947 | Kreyer ................... | 152/209.13 |
| 5,152,854 | 10/1992 | Matsumoto ................ | 152/209.28 |
| 5,421,391 | 6/1995 | Himuro ................... | 152/209.28 |
| 5,609,699 | 3/1997 | Himuro ................... | 152/209.28 |

FOREIGN PATENT DOCUMENTS

| | | | |
|---|---|---|---|
| 688685 | 12/1995 | European Pat. Off. ........ | 152/209.28 |
| 3901624 | 8/1989 | Germany .................. | 152/904 |
| 4026486 | 2/1992 | Germany .................. | 152/209.28 |
| 63-222907 | 9/1988 | Japan . | |
| 1-190504 | 7/1989 | Japan . | |
| 2-175303 | 7/1990 | Japan . | |
| 4-154408 | 5/1992 | Japan .................... | 152/209.28 |
| 4-193608 | 7/1992 | Japan . | |
| 4-254205 | 9/1992 | Japan .................... | 152/209.11 |
| 4-297307 | 10/1992 | Japan . | |
| 5-85107 | 4/1993 | Japan . | |
| 5-178023 | 7/1993 | Japan . | |
| 5-201207 | 8/1993 | Japan . | |
| 6-143937 | 5/1994 | Japan . | |
| 6-156015 | 6/1994 | Japan . | |
| 6-247109 | 9/1994 | Japan . | |
| 2224472 | 5/1990 | United Kingdom .......... | 152/209.28 |

Primary Examiner—Steven D. Maki
Attorney, Agent, or Firm—Arent Fox Kintner Plotkin & Kahn, PLLC

[57] ABSTRACT

A pneumatic tire wherein a plurality of righthand oblique groove groups each group of which has a plurality of righthand oblique grooves as extending obliquely to a reverse tire turning direction from a tread center portion to a righthand shoulder end and a plurality of lefthand oblique groove groups each group of which has a plurality of lefthand oblique grooves extending obliquely to the reverse tire turning direction from the tread center portion to a lefthand shoulder end are disposed alternately in a tire circumferential direction on a tread surface which has a tire turning direction designated in one direction in such a manner that one main rib is defined in a zigzag shape in the tire circumferential direction by starting end portions of the righthand oblique groove groups and by starting end portions of the lefthand oblique groove groups and lefthand and righthand sub ribs are branched from the main rib along the righthand oblique groove groups and the lefthand oblique groove groups, respectively.

6 Claims, 4 Drawing Sheets

PNEUMATIC TIRE AND PNEUMATIC TIRE SET

TECHNICAL FIELD

This invention relates to a pneumatic tire and a pneumatic tire set. More particularly, the present invention relates to a pneumatic tire and a pneumatic tire set having a tread pattern which can reconcile a passage noise reducing performance and a drainage performance.

BACKGROUND ART

It is generally known that it is advantageous to use a tread pattern having a directivity in the tire turning direction so as to ensure a good drainage performance. Patterns shown in FIGS. 4 and 5 are known as such directive patterns having a good drainage.

On a tread face 11 for which the tire turning direction R is designated in one direction, as shown in FIG. 4, there are arranged: four circumferential grooves 12 which are formed laterally symmetrically with respect to the tire equator line CL; and lefthand and righthand oblique grooves 13 which are arranged at predetermined pitches in a tire circumferential direction T and which are so extended to shoulder end portions as to expand from the two inner circumferential grooves 12 to the reverse tire turning direction. The directive tread pattern is formed with a number of blocks 14 divided by those circumferential grooves 12 and oblique grooves 13.

Meanwhile, in FIG. 5, the lefthand and righthand oblique grooves 13 are replaced by V-shaped grooves 15. The apexes of the V-shapes are positioned outside the tire equator line CL when the tire is attached to a vehicle, so that a directive tread pattern asymmetric with respect to the tire equator line CL is formed on the tread face 11. By adopting this asymmetric pattern, the turning drainage performance is enhanced more than that of the pneumatic tire of FIG. 4.

In recent years, a major problem is caused by the passage noise of vehicles. Especially, pneumatic tires having an improved drainage performance, as described above, produce high passage noise caused by the vibration of the blocks.

It is known effective as a method of lowering the passage noise in the prior art that the vibration of the blocks themselves are suppressed by enlarging the individual blocks to enhance the block rigidity. If the blocks are enlarged, however, the groove area of the oblique grooves 13 or the V-shaped grooves 15 is reduced. Therefore the drainage performance intrinsic to the aforementioned directive tread pattern is lowered. Especially the drainage performance at the time of turning is lowered.

The passage noise is caused not only by the aforementioned vibration of the blocks but also by the air pumping sound due to the grooves of the tread pattern. This air pumping sound is generated by the pumping action that the air in the grooves is compressed and released when the tread face is grounded onto the road surface while running. As a result, the pumping sound can be lowered more as the groove volume, i.e., the groove area is reduced more.

If the groove area is reduced, however, a drop in the drainage performance is invited, as described above. If, therefore, the passage noise is to be improved in a pneumatic tire having a directive tread pattern, there arises a problem that the compatibility with the drainage performance is extremely difficult.

The tire noise includes the exterior noise of the aforementioned passage noise and the interior noise. This interior noise is the noise which is generated by the contact of the tread portion of the tire running on the road surface with the road surface. It is generally known that the interior noise can be reduced by the pitch variation that transverse grooves are arranged at variable small pitches in the tread face in the tire circumferential direction. This effect of the pitch variation is heightened more for the smaller division of the tread face by the transverse grooves. If the tread face is divided into small, on the contrary, the tread rigidity is lowered, increasing the exterior noise. As a result, there arises a dilemma that the improvements in the interior noise and the exterior noise cannot be compatible.

DISCLOSURE OF INVENTION

A main object of the invention is to provide a pneumatic tire which has an improved passage noise reducing performance while keeping the high drainage performance intrinsic to the directive tread pattern.

Another object of the invention is to provide a pneumatic tire set enabling reduction of the passage noise while keeping the high drainage performance intrinsic to the directive tread pattern, by combining a plurality of pneumatic tires skillfully.

Still another object of the invention is to provide a pneumatic tire set enabling reduction of the exterior noise and the interior noise simultaneously while keeping the high drainage performance intrinsic to the directive tread pattern, by combining a plurality of pneumatic tires skillfully.

A pneumatic tire achieving the above-specified major object, according to the invention, is characterized in that on the tread face for which the tire turning direction is designated in one direction, there are alternately arrayed in a tire circumferential direction: a plurality of righthand oblique groove groups each group of which has a plurality of righthand oblique grooves extending obliquely to the reverse tire turning direction from a tread center portion to a righthand shoulder end; and a plurality of lefthand oblique groove groups each group of which has a plurality of lefthand oblique grooves extending obliquely to the reverse tire turning direction from the tread center portion to the lefthand shoulder end, and wherein on the tread center portion, there are formed: one main rib which is defined in a zigzag shape in the tire circumferential direction by the starting end portions of the righthand oblique groove groups and by the starting end portions of the lefthand oblique groove groups; and lefthand and righthand sub ribs which are branched from the main rib along the righthand oblique groove groups and the lefthand oblique groove groups, respectively.

Thus, by the lefthand and righthand oblique groove groups, there are formed: the main rib which is extended in the zigzag shape in the tire circumferential direction; and the lefthand and righthand sub ribs which are branched from the main rib along the oblique grooves. This makes it possible to realize a reinforced structure in which the main rib of the tread center portion is supported by the sub ribs in the reverse tire turning direction. As a result, the tread center portion which has the largest ground contacting length and exerts strong influence upon the passage noise can have a high circumferential rigidity, so that the vibration of the tread center portion can be suppressed and the passage noise can be reduced.

Moreover, there are alternately arranged in the tire circumferential direction the groups of the righthand oblique grooves extending obliquely to the reverse tire turning direction from the tread center portion to the rigthand shoulder end and the groups of the lefthand oblique grooves extending obliquely to the reverse tire turning direction from the tread center portion to the lefthand shoulder end. As a result, a high drainage performance can be exhibited by those oblique groove groups.

A pneumatic tire set achieving the aforementioned another object, according to the invention, comprises two lefthand and righthand front wheel pneumatic tires and two lefthand and righthand rear wheel pneumatic tires, characterized in that each of the front wheel pneumatic tires and rear wheel pneumatic tires is constructed such that on the tread face for which the tire turning direction is designated in one direction, there are alternately arrayed in a tire circumferential direction: a plurality of righthand oblique groove groups each group of which has a plurality of righthand oblique grooves extending obliquely to the reverse tire turning direction from the tread center portion to the righthand shoulder end; and a plurality of lefthand oblique groove groups each group of which has a plurality of lefthand oblique grooves extending obliquely to the reverse tire turning direction from the tread center portion to the lefthand shoulder end, and such that on the tread center portion, there are formed: one main rib which is defined in a zigzag shape in the tire circumferential direction by the starting end portions of the righthand oblique groove groups and by the starting end portions of the lefthand oblique groove groups; and lefthand and righthand sub ribs which are branched from the main rib along the righthand oblique groove groups and the lefthand oblique groove groups, respectively, and that the rear wheel pneumatic tires have a smaller groove area ratio than that of the front wheel pneumatic tires.

Thus, the groove area ratio of the rear wheel pneumatic tires which run on the wet road surface from which water is cleared by the front wheel pneumatic tires is made smaller than that of the front wheel pneumatic tires. This makes it possible to keep the drainage performance of the entire at a level substantially equivalent to that of a tire set in which the groove area ratio of the rear wheel pneumatic tires is equal to that of the front wheel pneumatic tires and to reduce the air pumping sound which changes in proportion to the magnitude of the groove area ratio. Therefore, in the set in which there are combined pneumatic tires having a reduced passage noise performance while keeping the high drainage performance intrinsic to the directive tread pattern, the passage noise can be further reduced while keeping the high drainage performance.

A pneumatic tire set achieving the aforementioned still another object, according to the invention, comprises two lefthand and righthand drive wheel pneumatic tires and two lefthand and righthand driven wheel pneumatic tires, characterized in that each of the drive wheel pneumatic tires is constructed such that on the tread face for which the tire turning direction is designated in one direction, there are alternately arrayed in a tire circumferential direction: a plurality of righthand oblique groove groups each group of which has a plurality of righthand oblique grooves extending obliquely to the reverse tire turning direction from the tread center portion to the righthand shoulder end; and a plurality of lefthand oblique groove groups each group of which has a plurality of lefthand oblique grooves extending obliquely to the reverse tire turning direction from the tread center portion to the lefthand shoulder end, and such that on the tread center portion, there are formed: one main rib which is defined in a zigzag shape in the tire circumferential direction by the starting end portions of the righthand oblique groove groups and by the starting end portions of the lefthand oblique groove groups; and lefthand and righthand sub ribs which are branched from the main rib along the righthand oblique groove groups and the lefthand oblique groove groups, respectively, and that the driven wheel pneumatic tires are constructed such that in the drive wheel pneumatic tires thin grooves are formed in the sub ribs at variable pitches in the tire circumferential direction.

Generally, drive wheels to which the drive force is transmitted from the engine, cause louder passage noise than driven wheels. In this pneumatic tire set, therefore, there are adopted for the drive wheels the construction of a pneumatic tire for reducing the passage noise while keeping the high drainage performance intrinsic to the aforementioned directive tread pattern, and for the driven wheels having a little influence on the passage noise, thin grooves are arranged at variable pitches in the sub ribs of the construction of the aforementioned drive wheel pneumatic tires. As a result, the kinds of sound-producing elements for the tread face to hit the road surface are increased so that the peak of the frequency offending the ear can be dispersed by the pitch variation effect by the sound-producing elements and thereby the interior noise can be reduced while keeping the high drainage performance.

BEST MODE FOR CARRYING OUT THE INVENTION

Figure 1:
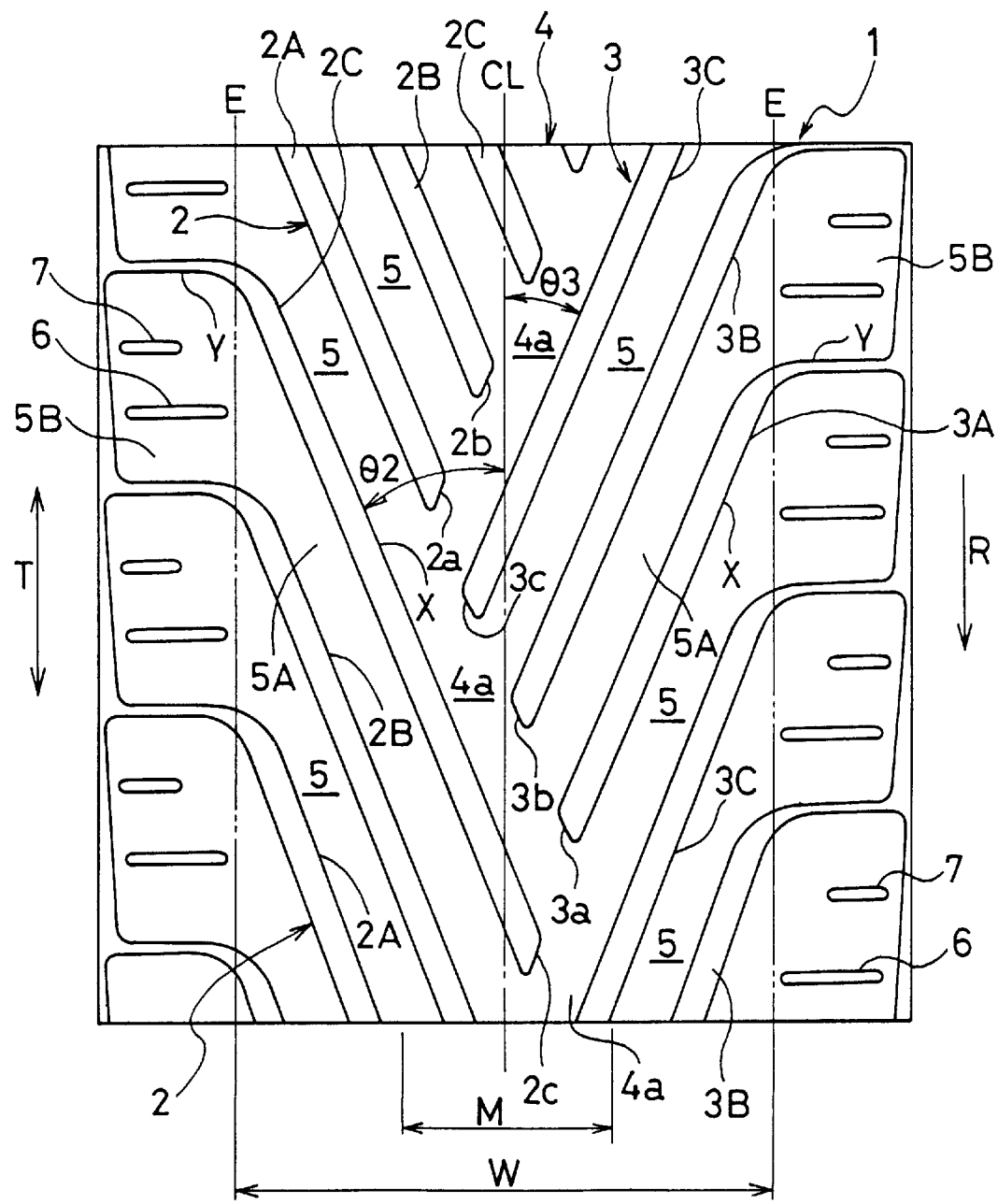
FIG. 1 is a development diagram of an essential portion of a tread face, showing one example of a pneumatic tire of the invention.

In FIG. 1, a tire is designated to turn in the direction indicated by arrow R. On a tread face 1, there are alternately arranged in a tire-circumferential direction T; a plurality of lefthand oblique groove groups 2 each group of which has three lefthand oblique grooves extending obliquely to the reverse tire turning direction from the tread center portion to the lefthand shoulder end; and a plurality of groups 3 each group of which has three righthand oblique grooves extending obliquely to the reverse tire turning direction from the tread center portion to the righthand shoulder end.

Each of oblique grooves 2A, 2B and 2C composing each of lefthand oblique groove groups 2 and each of oblique grooves 3A, 3B and 3C composing each of righthand oblique groove groups 3, respectively, is composed of a first groove portion X which extends obliquely to the tire width direction from the tread center portion up to a tire ground contacting end E and a second groove portion Y which extends straight along the tire width direction from the first groove portion X to the tire outer side. The first groove portion X is given a width two or more times as large as that of the second groove portion Y.

In each of lefthand and righthand oblique groove groups 2 and 3, the first groove portions X of the first oblique grooves 2A and 3A when seen in the tire turning direction R, are made the shortest. These individual first groove portions X fail to reach a tire equator line CL, so that their starting ends 2a and 3a are located in the tread center portion slightly spaced from the tire equator line CL of the tread face 1.

The first groove portions X of the second oblique grooves 2B and 3B are given longer lengths but they also fail to reach the tire equator line CL, and their starting ends 2b and 3b are located near the tire equator center line CL of the tread face 1.

The first groove portions X of the third oblique grooves 2C and 3C, as located closest to the reverse tire turning direction, are given the greatest lengths. The individual first groove portions X are extended over the tire equator line CL, so that their starting ends 2c and 3c are located across and near the tire equator line CL.

Thus, the three oblique grooves composing each of the lefthand and righthand oblique groove groups 2 and 3 are formed such that an oblique groove closer toward the reverse tire turning direction side is made longer on their inner end sides in the tread center portion whereas an oblique groove closer toward the tire turning direction R side are made shorter on their inner end sides. The starting ends 2a, 2b and 2c of the lefthand oblique grooves 2A, 2B and 2C and the starting ends 3a, 3b and 3c of the righthand oblique grooves 3A, 3B and 3C are arranged substantially straight, respectively.

In the tread center portion, there is formed one main rib 4 which is defined in a zigzag shape in the tire circumferential direction T by the starting end portions of the lefthand oblique groove groups 2 and by the starting end portions of the righthand oblique groove groups 3 described above. There are further formed lefthand and righthand sub ribs 5 which are branched from the main rib 4 along the oblique grooves composing the lefthand oblique groove groups 2 and the righthand oblique groove groups 3, respectively.

Each sub rib 5 is composed of a first sub rib portion 5A which extends obliquely in the reverse tire turning direction from the main rib 4 to the tire ground contacting end E and a second sub rib portion 5B which extends in the tire width direction from the first sub rib portion 5A to the tire outer side.

Each first sub rib portion 5A joins to each main rib portion 4a forming the straight portion of the zigzag of the main rib 4. The oblique direction of each of the main rib portions 4a and the first sub rib portions 5A thus joining are reversed with respect to the tire circumferential direction T, so that the first sub rib portions 5A support and reinforce the main rib 4 from the reverse tire turning direction side. Three sub ribs 5 are branched from each main rib portion 4a of the main rib 4 which is formed in the zigzag shape across the tire equator line CL. The first sub rib portions 5A and the main rib 4 are given substantially equal rib widths.

In each second sub rib portion 5B, there are so arranged two sub grooves 6 and 7 extending straight in the tire width direction that they are substantially equally spaced in the tire circumferential direction T. These two sub grooves 6 and 7 are given substantially the same groove width as that of the second groove portion Y. The sub groove 6 located on the tire turning direction R side is given a larger length by extending it longer to the tire ground contacting end E than the sub groove 7.

By the lefthand oblique groove groups 2 and the righthand oblique groove groups 3 thus inclined to the reverse tire turning direction, there are formed the single main rib 4 which is extended in the zigzag shape at the tread center portion in the tire circumferential direction T, and the lefthand and righthand sub ribs 5 which are branched from the main rib 4 along the oblique grooves 2A, 2B and 2C, and 3A, 3B and 3C. Thus, a construction can be realized such that the zigzag shaped main rib 4, provided at the tread center portion is supported from the reverse tire turning direction side by the lefthand and righthand sub ribs 5. As a result, the circumferential rigidity of the tread center portion, which greatly influences the passing noise because of the largest ground contacting length, can be effectively enhanced to reduce the passing noise which is caused by the vibration at the tread center portion.

Moreover, the lefthand and righthand oblique groove groups 2 and 3, which extend obliquely to the reverse tire turning direction from the tread center portion to the lefthand and righthand shoulder ends, are alternately arranged in the tire circumferential direction T, so that a high drainage can be achieved during the running by those oblique groove groups. As a result, the passage noise can be improved while retaining the high drainage performance which is intrinsic to the directive tread pattern.

Figure 2:
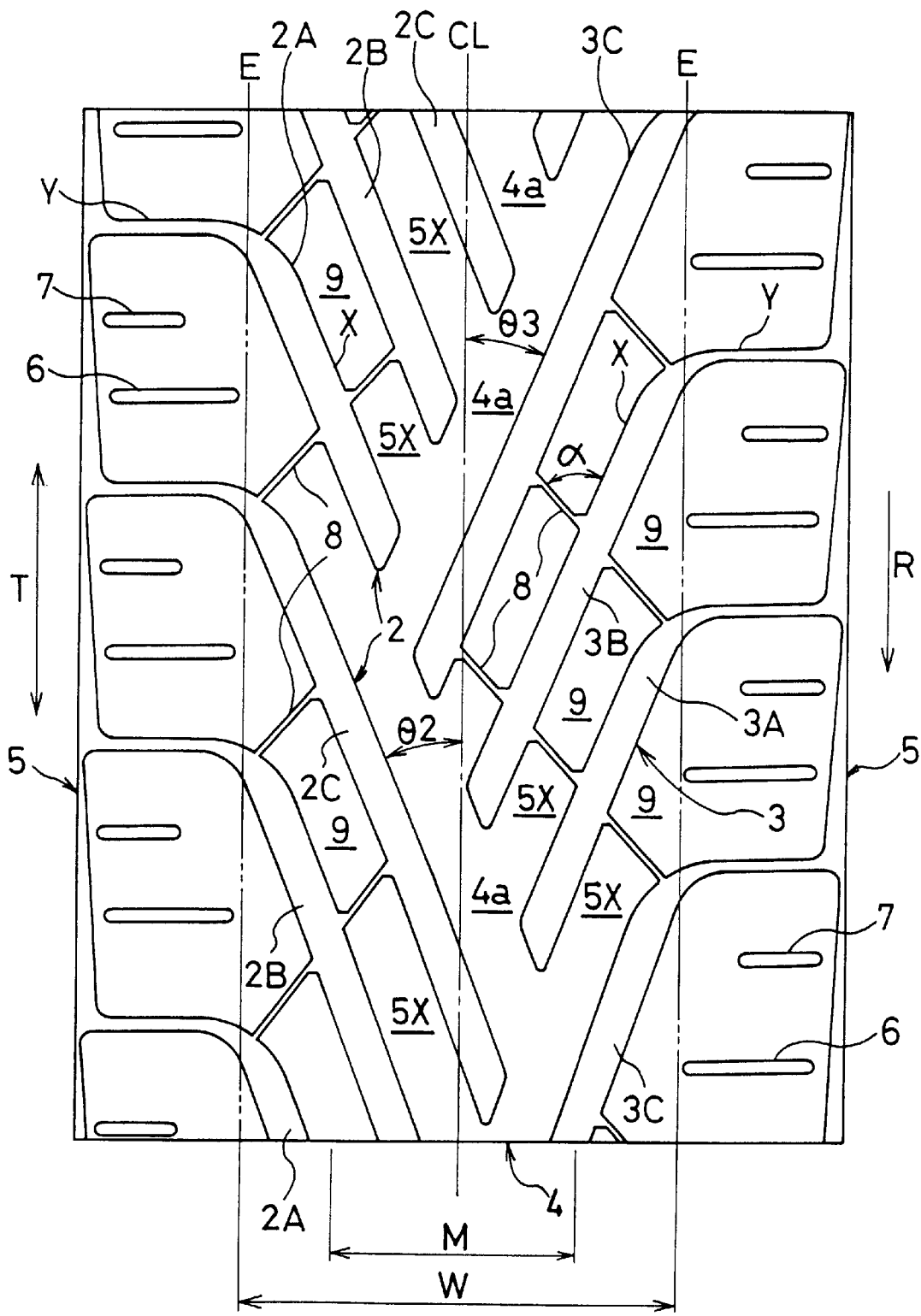
FIG. 2 is a development diagram of an essential portion of a tread face, showing another example of a pneumatic tire of the invention.

FIG. 2 shows another example of a pneumatic tire of the invention. In the foregoing example, moreover, there are formed straight thin grooves 8 in the lefthand and righthand sub ribs 5. In each of the sub ribs 5 at least one thin groove 8 is placed in such a manner that it crosses the sub rib 5 in the middle. Each sub rib 5 is composed of a sub rib portion 5X joining to the main rib 4 and at lest one block 9 which is defined by the front and rear oblique grooves and the thin groove 8. As shown in the drawing two thin grooves 8 are respectively formed between the oblique grooves 2A and 2B and between the oblique grooves 3A and 3B; three thin grooves 8 are respectively formed between the oblique grooves 2B and 2C and between the oblique grooves 3B and 3C; and one thin groove 8 is respectively formed between the oblique grooves 2C and 2A and between the oblique grooves 3C and 3A. The individual thin grooves 8 are arranged on straight lines which extend at an inclination to the reverse tire turning direction toward the tire inner side from the bent portions where the first groove portions X and the second groove portions Y of the lefthand and righthand individual oblique grooves join.

Thus, the sub ribs 5 for reinforcing the main rib 4 need not be extended long over the tire ground contacting end E. Even if the sub ribs 5 are divided into the sub rib portions 5X formed integrally with the main rib 4 and the block 9 by the thin grooves 8, the passage noise can be improved by the reinforcing effect of the sub rib portions 5X.

In the pneumatic tire according to the present invention, the angles of inclinations θ2 and θ3 of the lefthand and righthand oblique grooves to the tire circumferential direction T can be individually set within a range of 5 to 30 degrees. If these inclination angles θ2 and θ3 exceed 30 degrees, the reinforcing action by the sub ribs 5 drop, so that the passage noise cannot be effectively improved, and it also becomes difficult to retain the high drainage performance. Less than 5 degrees, on the other hand, the drainage performance at the time of turning is deteriorated. The range is preferred to fall within 15 to 25 degrees.

The main rib 4 is preferably formed into the zigzag shape having ten to thirty inflection points (i.e., the number of bends of the zigzag shape) for retaining the rigidity of the tread center portion.

The main rib 4 can be given a zigzag width M 0.09 to 0.4 times as large as the tire ground contacting width W. If the zigzag width M is smaller than 0.09 W, the effect produced by extending the oblique grooves 2C and 3C across the tire equator line CL is lowered to invite deterioration of the drainage performance. More than 0.4 W, on the other hand, the groove area ratio of the tread center portion is substantially reduced, lowering the drainage performance. The preferable range may be within 0.15 W to 0.4 W, so that the problem of drainage performance is not invited over the entire range (5 to 30 degrees) of the aforementioned inclination angles θ2 and θ3.

The three sub ribs 5 are arranged for each rib portion 4a of the main rib 4, as shown in FIGS. 1 and 2, for the reinforcing purpose, but the number of sub ribs 5 can be two to four. In other words, the number of the oblique grooves composing each of the lefthand and righthand oblique groove groups 2 and 3 can be two to four.

The angle α formed between the oblique grooves and the thin grooves 8 may preferably be set within a range of 50 to 100 degrees from the standpoint of the wear of the formed blocks 9.

The width of the thin grooves 8 can be set to 2 to 4 mm. These thin grooves 8, as shown, join at their two ends to the front and rear oblique grooves. However, the sub ribs 5 having the thin grooves 8 with no block may be formed by arranging the thin grooves 8 such that at least their one-side ends do not join to the oblique grooves. Moreover, these thin grooves may be replaced by groove portions such as sipes or notches.

In the foregoing mode the oblique grooves composing the lefthand oblique groove groups 2 and the righthand oblique groove groups 3 are so arranged as to have the same widths. But the oblique grooves arranged at the outer region of the vehicle from the tire equator line CL when the tire is attached to the vehicle may be given wider widths, and consequently the drainage performance can be further enhanced.

In the present invention, the tread center portion is the area which extends lefthand and righthand by 0.2 times of the tire ground contacting width W from the tire equator line CL.

According to the invention, when the pneumatic tires having the aforementioned directive tread pattern are used for the front and rear wheels of a rear-wheel-drive vehicle, the passage noise can be further reduced by using the pneumatic tires as a set having the following combination.

Figure 3:
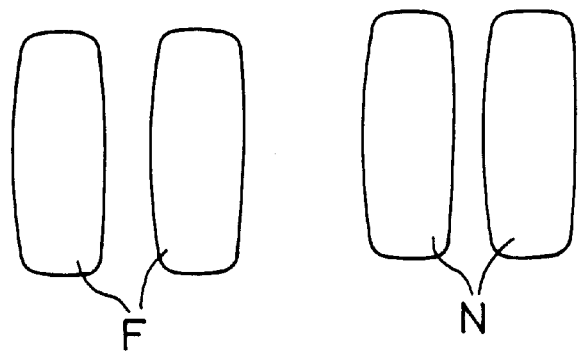
FIG. 3 is an explanatory diagram showing an example of a pneumatic tire set of the invention.

Such a tire set is composed of two lefthand and righthand front wheel pneumatic tires F and two lefthand and righthand rear wheel pneumatic tires N, as shown in FIG. 3. The rear wheel pneumatic tires N are given oblique grooves narrower than those of the front wheel pneumatic tires F, and a smaller groove area ratio lower than that of the front wheel pneumatic tires F.

We have keenly investigated the method of further improving the passage noise without any drop in the drainage performance. The investigation has found out that the passage noise due to the air pumping sound can be improved while maintaining a high drainage performance by specifying the combination of the front and rear pneumatic tires attached to the vehicle, in addition to the foregoing proposals of the pneumatic tires.

During the running of a vehicle the rear wheel pneumatic tires follow the running paths of the front wheel ones. On a wet road surface, therefore, the rear wheel pneumatic tires run on the road surface which has been cleared of water by the front wheel ones. As a result, the overall drainage performance of the vehicle can be kept substantially at the same level even if the rear wheel pneumatic tires are given a drainage performance lower to some extent than that of the front wheel pneumatic tires.

In the rear-wheel-drive vehicle, meanwhile, the driven rear wheel pneumatic tires exert more adverse influence upon the passage noise than the front wheel pneumatic tires. The air pumping sound can be reduced by reducing the groove area ratio of the rear wheel pneumatic tires, and hence the passage noise can be reduced.

In a general set, the front and rear wheels employ pneumatic tires having the same groove area ratios. On the contrary, the invention proposes a pneumatic tire set of which the pneumatic tires for the rear wheels have a smaller groove area ratio than that of the pneumatic tires for the front wheels. As a result, the passage noise can be further reduced while keeping the high drainage performance.

The difference in the groove area ratio is preferably set within a range of 3 to 5%. The effect to improve the passage noise is lowered, if the difference is less than 3%, and the drainage performance is deteriorated as a balance of groove areas between the front and rear wheel pneumatic tires is lost if more than 5%.

The method of making the groove area ratio different should not be limited to the construction in which the oblique grooves 2A, 2B and 2C, and 3A, 3B and 3C are given the different widths. However, the construction may be modified to change the groove area ratio by equalizing the widths of the lefthand and righthand oblique grooves and by using as the front wheel pneumatic tires M the tires having the tread pattern of FIG. 2 in which the thin grooves 8 are formed in the sub ribs 5, and as the rear wheel pneumatic tires N the tires having the tread pattern of FIG. 1 in which the thin grooves 8 are not formed in the sub ribs 5.

The pneumatic tires used for the front and rear wheels can be individually given a groove area ratio ranging from 25 to 40%. The passage noise is deteriorated over the practically allowable range if the groove area ratio is more 40%. On the other hand, the drainage performance is deteriorated over the practically allowable range if less 25%. Preferably, the groove area ratio may be set within a range of 30 to 36%.

Although this pneumatic tire set attached to the rear-wheel-drive vehicle has been described, it can be adequately employed in a recent four-wheel-drive vehicle in which the drive wheels can be switched to the rear wheels.

When the pneumatic tires having the aforementioned directive tread pattern are employed as a pneumatic tire set composed of two lefthand and righthand drive wheel pneumatic tires and two lefthand and righthand driven (idle) wheel pneumatic tires, according to the present invention, the exterior noise and the interior noise can be simultaneously reduced by the following combination.

The tires having the tread pattern of FIG. 1 are employed as the drive wheel pneumatic tires, and the tires having the tread pattern of FIG. 2 are employed as the driven wheel pneumatic tires. The thin grooves 8 provided in the lefthand and righthand sub ribs 5 in FIG. 2 are arranged at equal pitches in the tire circumferential direction, as shown. But here in this tire set, the thin grooves 8 are arranged at variable pitches in the tire circumferential direction T. These thin grooves 8 may be given the aforementioned width of 2 to 4 mm.

The pneumatic tires attached to the drive wheels cause a higher passage noise than those attached to the driven wheels while running because the drive force is transmitted thereto from the engine. In this tire set, therefore, there is adopted for the drive wheels a construction of the pneumatic tires described above for reducing the passage noise while keeping the high drainage performance intrinsic to the directive tread pattern. Meanwhile, for the idle wheels having a smaller influence of the passage noise, there is adopted a construction of pneumatic tires where the thin grooves 8 are arranged at the variable pitches in the sub ribs 5 in the aforementioned drive wheel pneumatic tires. As a result, the kinds of sound-producing elements of the tread face striking the road surface can be increased so that the peak of the frequency offending the ear can be dispersed by the pitch variation effect by the sound-producing elements and thereby the interior noise can be reduced while keeping the high drainage performance.

EXAMPLE 1

Figure 4:
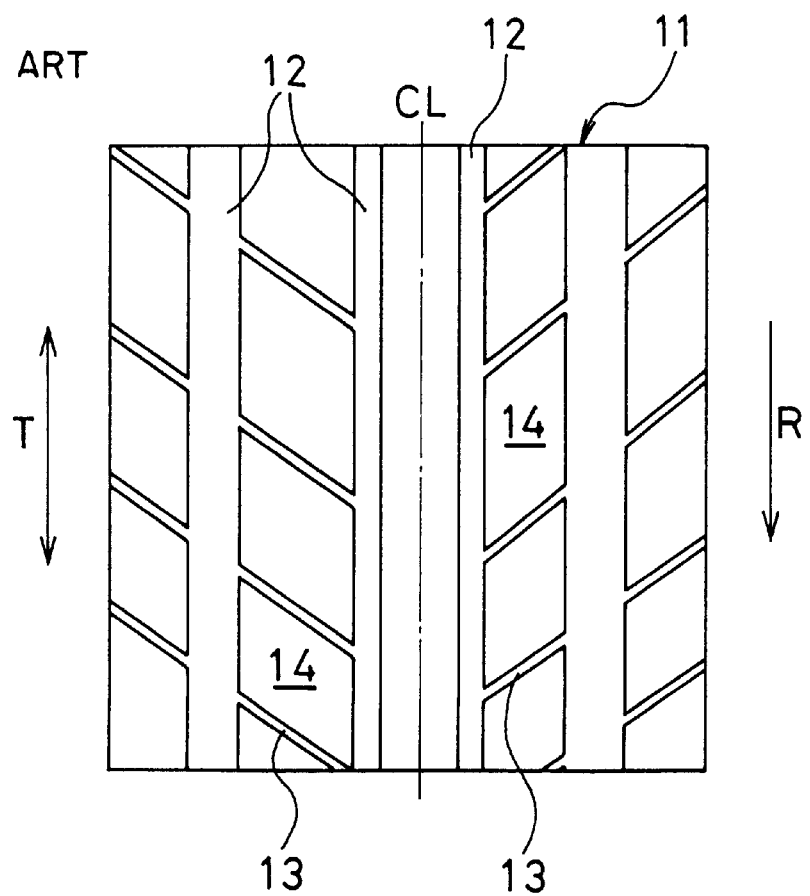
FIG. 4 is a development diagram of an essential portion of a tread face showing an example of a pneumatic tire of the prior art.
Figure 5:
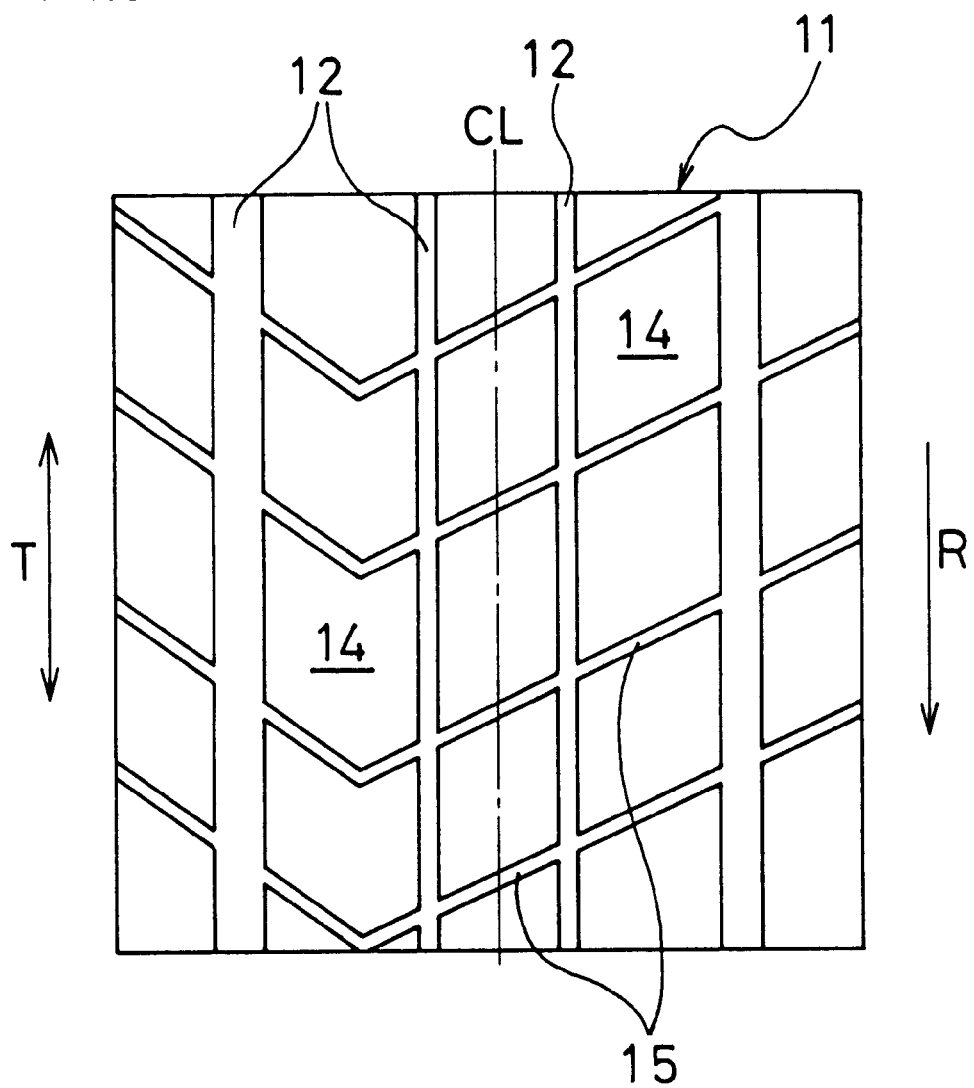
FIG. 5 is a development diagram of an essential portion of a tread face showing another example of a pneumatic tire of the prior art.

A tire of the invention and conventional tires 1, 2 were prepared sharing the tire size of 225/50R16. The tire of the invention was given the tread pattern of FIG. 1 in which the lefthand and righthand oblique groove groups were alternately arrayed in the tire circumferential direction and in which one zigzag main rib and lefthand and righthand sub ribs were formed. Conventional tires 1 and 2 were given the tread patterns shown in FIGS. 4 and 5.

In the tire of the invention: both the inclination angles θ2 and θ3 of the oblique grooves were 20 degrees; the number of inflection points was 24; and the zigzag width M was 20 mm (0.24 W).

These individual test tires were attached to a vehicle having an engine displacement of 2.5 l by mounting them on rims having a size of 16×8J and setting the air pressure to 250 KPa. The passage noise and the drainage performance were evaluated under the following measurement conditions to achieve the results of Table 1.

Passage Noise

The passage sound was measured by a testing method conforming to ISO362, and the results were evaluated in terms of exponential values with those of the conventional tire 1 at 100. Higher values indicate that the passage noise is weaker.

Drainage Performance

A wet road surface having a length of 10 m and a depth of 10 mm was formed on a circular test road having a radius of 100 m. Transverse accelerations were measured when the vehicle turned at a constant speed on the wet road surface, and the speed of when the transverse accelerations took the maximum was measured. The results were evaluated in terms of exponential values with those of the conventional tire 1 at 100. Higher value indicate that the drainage performance is more excellent.

TABLE 1

|  | Tire of the Invention | Conventional Tire 1 | Conventional Tire 2 |
| --- | --- | --- | --- |
| Passage Noise | 104 | 100 | 100 |
| Drainage Performance | 105 | 100 | 105 |

As apparent from Table 1, the tire of the invention can reduce the passage noise highly while keeping the drainage performance at the same level as that of the conventional tire 2.

EXAMPLE 2

There were prepared test tires 1 to 5 having the same tire size as that of Example 1 and having the tread pattern of FIG. 1, in which the lefthand and righthand oblique grooves had angles of inclination, as listed in Table 2. The number of inflection points and the zigzag width M were also listed in Table 2.

For these test tires, the passage noise and the drainage performance was evaluated as in Example 1 and the results are shown in Table 2.

TABLE 2

|  | TT1 | TT2 | TT3 | TT4 | TT5 |
| --- | --- | --- | --- | --- | --- |
| AI | 3 | 5 | 20 | 30 | 35 |
| IP | 10 | 16 | 24 | 24 | 24 |
| ZW | 7/0.08W | 8/0.09W | 20/0.24W | 34/0.40W | 41/0.48W |
| PN | 106 | 105 | 104 | 101 | 100 |
| DP | 98 | 103 | 105 | 103 | 100 |

TT: Test Tire
AI: Angle of inclination (degrees)
IP: Number of Inflection Points
ZW: Zigzag Width (mm)
PN: Passage Noise
DP: Drainage Performance It is understood from Table 2 that the passage noise could be reduced while retaining a higher drainage performance than that of the pneumatic tire of FIG. 4 having the directive tread pattern of the prior art, by setting the angle of inclination of the lefthand and righthand oblique grooves within a range of 5 to 30 degrees.

EXAMPLE 3

A test tire set 1 and a test tire set 2 were prepared having the size of 205/55ZR16 for the front wheel pneumatic tires and the size of 225/55ZR16 for the rear wheel pneumatic tires, and the common tread pattern of FIG. 1. The test tire set 1 was set such that the groove area ratio of the two lefthand and righthand rear wheel pneumatic tires was made smaller than that of the two lefthand and righthand front wheel pneumatic tires, and the test tire set 2 was set such that the individual two lefthand and righthand rear wheel and front wheel pneumatic tires were given the same groove area ratios.

In the test tire set 1, the front wheel pneumatic tires had the groove area ratio of 35%, and the rear wheel pneumatic tires had the groove area ratio of 30%. The test tire set 2 had the groove area ratio of 35% for both the front and rear wheel pneumatic tires.

Both the test tire sets commonly had the inclination angles θ2 and θ3 of 20 degrees, the number of inflection points of 24 for the main ribs, and the zigzag width M of 0.24 W.

These individual two test tires were attached to a rear-wheel-drive vehicle having an engine displacement of 2.5 l by mounting them on rims having a size of 16×7J (for the front wheel tires) and having a size of 16×8 J (for the rear wheel tires) and by setting the air pressure to 200 KPa (for the front wheel tires) and 250 KPa (for the rear wheel tires). The passage noise and the drainage performance were evaluated under the measurement conditions described above to achieve the results of Table 3. Here, the evaluations were made in terms of exponential values, with the values of the test tire set 2 being 100.

TABLE 3

|                     | TT Set 1 | TT Set 2 |
|---------------------|----------|----------|
| Passage Noise       | 109      | 100      |
| Drainage Performance| 99       | 100      |

It is seen from Table 3 that the passage noise could be further reduced while keeping the drainage performance at substantially the same level, by making the groove area ratio of the rear wheel pneumatic tires smaller than that of the front wheel pneumatic tires.

EXAMPLE 4

The test tire sets 3 to 6 were individually prepared by giving them the same tire size as that of Example 3 and by giving them the tread pattern of FIG. 1, in which the groove area ratios of the front wheel pneumatic tires and the rear wheel pneumatic tires were varied as shown in Table 3.

Both the test tire sets commonly had the inclination angles θ2 and θ3 of 20 degrees, the number of inflection points of 24 for the main ribs, and the zigzag width M of 0.24 W.

The evaluation test on the passage noise and drainage performance of the test tire sets were made similarly to Example 3 and the results are shown in Table 4.

TABLE 4

|     | TT Set 3 | TT Set 4 | TT Set 5 | TT Set 6 |
|-----|----------|----------|----------|----------|
| GAR | 35/34    | 35/32    | 35/30    | 35/28    |
| PN  | 100      | 105      | 109      | 111      |
| DP  | 100      | 100      | 99       | 90       |

GAR: Groove Area Ratio
TT: Test Tire
PN: Passage Noise
DP: Drainage Performance

EXAMPLE 5

The test tire sets 7 and 8 were prepared which have a tire size of 225/50R16 for the drive wheels and the driven wheels. The test tire set 7 was composed of two lefthand and righthand drive wheel pneumatic tires having the tread pattern of FIG. 1 and two lefthand and righthand driven wheel pneumatic tires, in which thin grooves were arranged at variable pitches in the tread pattern of FIG. 2. The test tire set 8 was the same as the test tire set 7 except that the idle wheel pneumatic tires didn't have the thin grooves and had the tread pattern of FIG. 1.

Both the test tire sets commonly had the inclination angles θ2 and θ3 of 20 degrees, the number of inflection points of 24 for the main ribs, and the zigzag width M of 0.24 W. The oblique grooves and the thin grooves of the test tire set 7 formed the angle α of 60 degrees.

These individual test tires were attached to a rear-wheel-drive vehicle having an engine displacement of 2.5 l by mounting them on rims having a size of 16×8J and setting the air pressure to 250 KPa. The passage noise and the drainage performance were evaluated under the measurement conditions of Example 1, and the interior noise was evaluated under the following measurement conditions, and the results are shown in Table 5.

Interior Noise

On a test course, the feeling test of the interior noise in running at 50 Km/h was made by test drivers, and the results were evaluated with exponential values, with those of the test tire set 8 being 100. Higher value indicates weaker interior noise.

TABLE 5

|                      | Test Tire Set 7 | Test Tire Set 8 |
|----------------------|-----------------|-----------------|
| Passage Noise        | 104             | 104             |
| Drainage Performance | 105             | 105             |
| Interior Noise       | 106             | 100             |

It is understood from Table 5 that both the passage noise being the exterior noise and the interior noise could be reduced while keeping the high drainage performance intrinsic to the directive tread pattern, by arranging the thin grooves at variable pitches.

In the pneumatic tire of the invention, as has been described hereinbefore, by the lefthand and righthand oblique groove groups inclined to the reverse tire turning direction, there are formed at the tread center portion: a single main rib which is extended in the zigzag shape in the tire circumferential direction; and a plurality of sub ribs which are branched from the main rib along the oblique grooves composing the lefthand and righthand oblique groove groups. As a result, the circumferential rigidity of the tread center portion, which influences the passage noise greatly because of having the largest ground contacting length, can be enhanced and the passage noise can be reduced.

Moreover, the lefthand and righthand oblique groove groups, alternately arrayed in the tire circumferential direction, extends from the tread center portion to the lefthand and righthand shoulder ends, inclining to the reverse tire turning direction, so that a high drainage performance can be achieved in running by those oblique groove groups. As a result, it is possible to reduce the passage noise and to keep the high drainage performance which is intrinsic to the directive tread pattern.

In the pneumatic tire set of the invention which employs the aforementioned pneumatic tires and which is composed of the two lefthand and righthand front wheel pneumatic tires and the two lefthand and righthand rear wheel pneumatic tires, the rear wheel pneumatic tires running on the road surface which has been cleared of water by the front wheel pneumatic tires, are given a lower groove area ratio than that of the front wheel pneumatic tires. As a result, the air pumping sound can be lowered while keeping the drainage performance substantially at the same level in all the vehicle as that of the construction in which the groove area ratio of the rear wheel pneumatic tires is equalized to that of the front wheel pneumatic tires. As a result, the passage noise can be further reduced while keeping the high drainage performance.

In another pneumatic tire set of the invention which employs the aforementioned pneumatic tires and which is composed of the two lefthand and righthand drive wheel pneumatic tires and the two lefthand and righthand idle pneumatic tires, a construction of the pneumatic tires described above for reducing the passage noise while keeping the high drainage performance is adopted in the drive wheels having great influence on the passage noise. In the idle wheels having a smaller influence on the passage noise, there is adopted a construction of the pneumatic tires in which the thin grooves are arranged at the variable pitches in the sub ribs in the construction of the aforementioned drive wheel pneumatic tires. As a result, the interior noise can be reduced by dispersing the noisy frequency peak by the pitch variation effect while keeping the high drainage performance.

INDUSTRIAL APPLICABILITY

The invention having the aforementioned excellent effects can be extremely effectively utilized in the pneumatic tires to be used in a passenger car.

What is claimed is:

1. A pneumatic tire set comprising lefthand and righthand front wheel pneumatic tires and lefthand and righthand rear wheel pneumatic tires, wherein each of said front wheel pneumatic tires and said rear wheel pneumatic tires is constructed such that a plurality of righthand oblique groove groups each group of which has three or four righthand oblique grooves extending obliquely to a reverse tire rotating direction from a tread center portion to a righthand shoulder and a plurality of lefthand oblique groove groups each group of which has three or four lefthand oblique grooves extending obliquely to the reverse tire rotating direction from the tread center portion to a lefthand shoulder end are disposed alternately in a tire circumferential direction on a tread surface which has a tire rotating direction designated in one direction in such a manner that one main rib is defined in a zigzag shape in the tire circumferential direction by starting end portions of said righthand oblique groove groups and by starting end portions of said lefthand oblique groove groups and lefthand and righthand sub ribs are branched from said main rib along said righthand oblique groove groups and said lefthand oblique groove groups, respectively, wherein the oblique grooves composing said righthand oblique groove groups and said lefthand oblique groove groups individually have angles of 5 to 25 degrees with respect to the tire circumferential direction, and wherein thin grooves are formed in the sub ribs of the front tires but are not formed in the sub ribs of the rear tires ao that said rear wheel pneumatic tires have a smaller groove area ratio than that of said front wheel pneumatic tires.

2. A pneumatic tire set as set forth in claim 1, wherein the groove area ratio of each of said rear wheel pneumatic tires is made smaller by 3 to 5% than that of each of said front wheel pneumatic tires.

3. A pneumatic tire set as set forth in claim 1, wherein said main rib in each of said front wheel pneumatic tires and said rear wheel pneumatic tires is formed into a zigzag shape having ten to thirty inflection points.

4. A pneumatic tire set as set forth in claim 1, wherein said main rib in each of said front wheel pneumatic tires and said rear wheel pneumatic tires has a zigzag width M of 0.09 to 0.4 times as large as the tire ground contacting width W.

5. A pneumatic tire set as set forth in claim 1, wherein an angle $\alpha$ between said thin grooves and said oblique grooves is 50 to 100 degrees.

6. A pneumatic tire set as set forth in claim 1, wherein the groove area ratio of each of said front wheel pneumatic tires and said rear wheel pneumatic tires is within a range of 25 to 40% respectively.

* * * * *